United States Patent [19]

Chin et al.

[11] Patent Number: 5,010,952
[45] Date of Patent: Apr. 30, 1991

[54] TUBULAR MEMBER SECURED WITHIN A WELL SUPPORT MEMBER WITH A PRELOAD

[75] Inventors: Arthur H. T. Chin, Houston; Thomas R. Schmitz, Katy, both of Tex.

[73] Assignee: Cooper Industries, Inc., Houston, Tex.

[21] Appl. No.: 98,197

[22] Filed: Sep. 17, 1987

[51] Int. Cl.⁵ .................. E21B 19/16; E21B 33/04
[52] U.S. Cl. .................. 166/75.1; 166/206; 166/379; 166/380; 285/140; 285/382.4; 285/382.5
[58] Field of Search ............ 166/75.1, 379, 88, 206, 166/207, 380; 285/140-143, 382.4, 382.5; 29/523

[56] References Cited

U.S. PATENT DOCUMENTS

| | | | |
|---|---|---|---|
| 2,134,311 | 10/1938 | Minor et al. | 285/140 X |
| 2,715,536 | 8/1955 | Shuptrine et al. | 385/140 |
| 2,793,059 | 5/1957 | Woodling | 285/382.4 |
| 2,920,909 | 1/1960 | Allen | 285/146 |
| 3,167,333 | 1/1965 | Hall et al. | 285/140 |
| 3,208,136 | 9/1965 | Joslin | 29/523 |
| 3,311,168 | 3/1967 | Pierce, Jr. | 166/89 |
| 3,432,916 | 3/1969 | Fisher et al. | 29/516 |
| 3,534,988 | 10/1970 | Lindsey | 29/523 |
| 3,982,778 | 9/1976 | Spencer et al. | 29/523 |
| 4,330,144 | 5/1982 | Ridenour | 285/382.5 |
| 4,388,752 | 6/1983 | Vinciguera et al. | 285/382.5 X |
| 4,662,663 | 5/1987 | Schmitz | 285/382.5 |

Primary Examiner—Bruce M. Kisliuk

[57] ABSTRACT

The improved joint of the present invention includes a tubular member which is cold formed into tight gripping and sealing engagement within an internal grooved recess within a support member, such a wellhead housing. The upper end of the recess is tapered upwardly and inwardly and the upper end of the tubular member of a wedge ring mounting between the upper end of the tubular member and the tapered surface of the recess is positioned against the tapered surface of the recess so that when the cold forging step is performed the upper end of the tubular member is compressed downwardly to introduce the compression preload into the joint.

5 Claims, 6 Drawing Sheets

TUBULAR MEMBER SECURED WITHIN A WELL SUPPORT MEMBER WITH A PRELOAD

BACKGROUND

Tubular members have been supported within well bores in hangers which are in turn seated and supported from the well housing. Prior hangers have normally used slips to engaged and support the tubular members or well strings. Examples of such hangers are shown in U.S. Pat. Nos. 2,920,909 and 3,311,168. Other hangers have had their string threaded into their lower end and have seated on an internal seat within the well housing.

It has been known to cold form a tubular member into an annular connector in a remote location, such as in a subsea pipeline repair. This is shown in U S. Pat. Nos. 3,432,916, 4,330,144 and 4,388,752. U.S. Pat. No. 4,662,663 discloses the use of pressure compensating material between the two members being cold formed to prevent the buildup of pressure which would prevent the proper completion of the cold forming.

Prior, copending, U.S. Pat. Application Ser. No. 044,409, filed Apr. 30, 1987 discloses the use of cold forming of a well string into a hanger, specifically as shown in FIG. 7 in such application.

Summary

The present invention is an improvement on the aforementioned prior, copending Application Ser. No. 044,409, which is assigned to the same assignee as the assignee of the present application. The improvement of the present invention involves the shape of the recess in the well string support member and the positioning of the tubular member with respect to such recess shape so that an axial compression preload is introduced during the cold forming to thereby assist in the support of compression axial loads in operations. The improved method includes the steps of placing the end of the tubular member within the inner recess in the well support member with its end in engagement with the tapered surface at the end of the recess and cold forming the tubular member into tight gripping and sealing engagement with the well support member. The improved joint includes the well support member having an internal recess for receiving the end of the tubular member therein, the end of the recess in tapered inward and in a direction axially away from the remainder of the recess. The tubular member is cold formed into the recess within the well support member which by utilizing the tapered end of the recess provides a compression preload on the joint.

An object of the present invention is to provide an improved method of securing a tubular member within a well support member in a cold forming step so that the joint is preloaded axially.

Another object is to provide an improved joint between a tubular member and an annular well support member in which the joint is axially preloaded.

A further object is to provide an improved joint between a wellhead support member and a well string which provides a preloaded tight gripping and sealing engagement between such support member and well string.

BRIEF DESCRIPTION OF THE DRAWINGS

These and other objects and advantages of the present invention are hereinafter set forth and explained with respect to the drawings wherein.

DESCRIPTION OF THE PREFERRED EMBODIMENT

Figure 1:
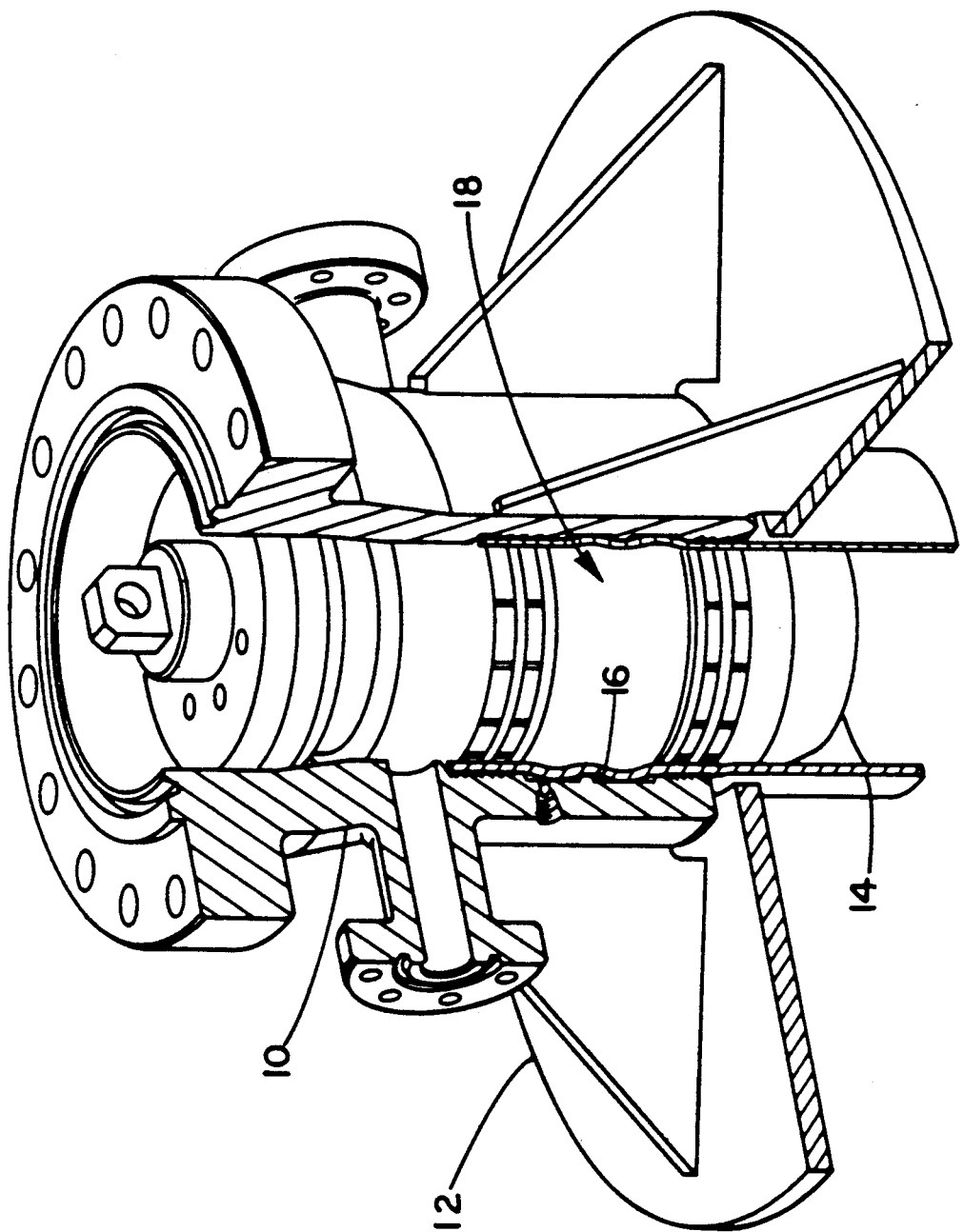
FIG. 1 is an isometric view, partly in section, of a well support member with the tubular member positioned within the support member internal recess after cold forming and the cold forming tool the tubular member is within the tubular member.

Wellhead housing 10 shown in FIG. 1 is provided with flange 12 which extends radially outward to provide support for housing 10 either on the bottom of a body of water or on a pipe on which it is landed on a platform above the water surface. Tubular member or string 14 is shown positioned within housing 10 after having been formed into the specially prepared inner surface 16 of housing 10 as hereinafter described. Forming tool 18 is positioned within housing 10 and within tubular member 14 in its forming position.

Figure 2:
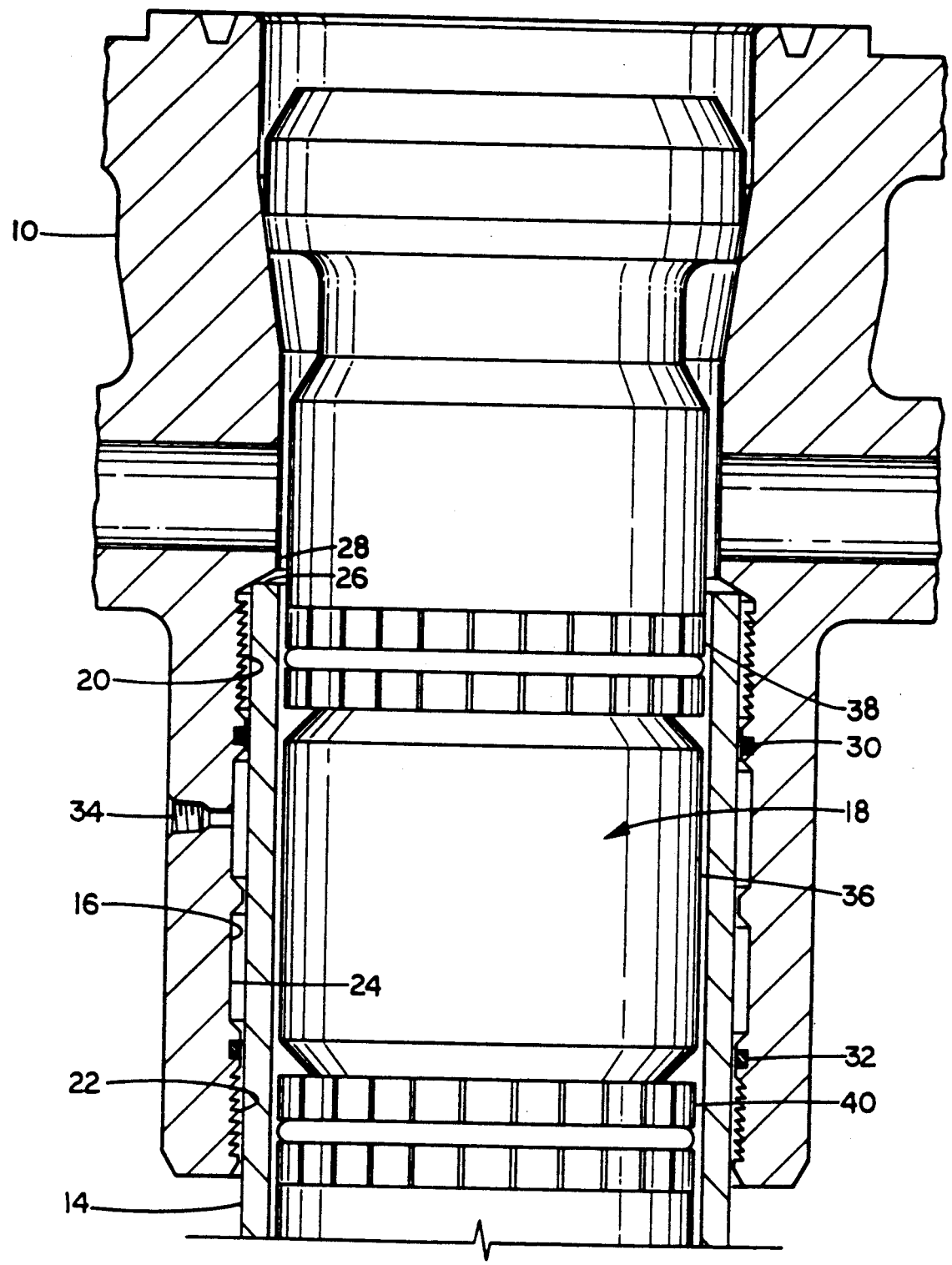
FIG. 2 is a partial sectional view of the position of member within the recess in the well support member prior to cold forming.
Figure 3:
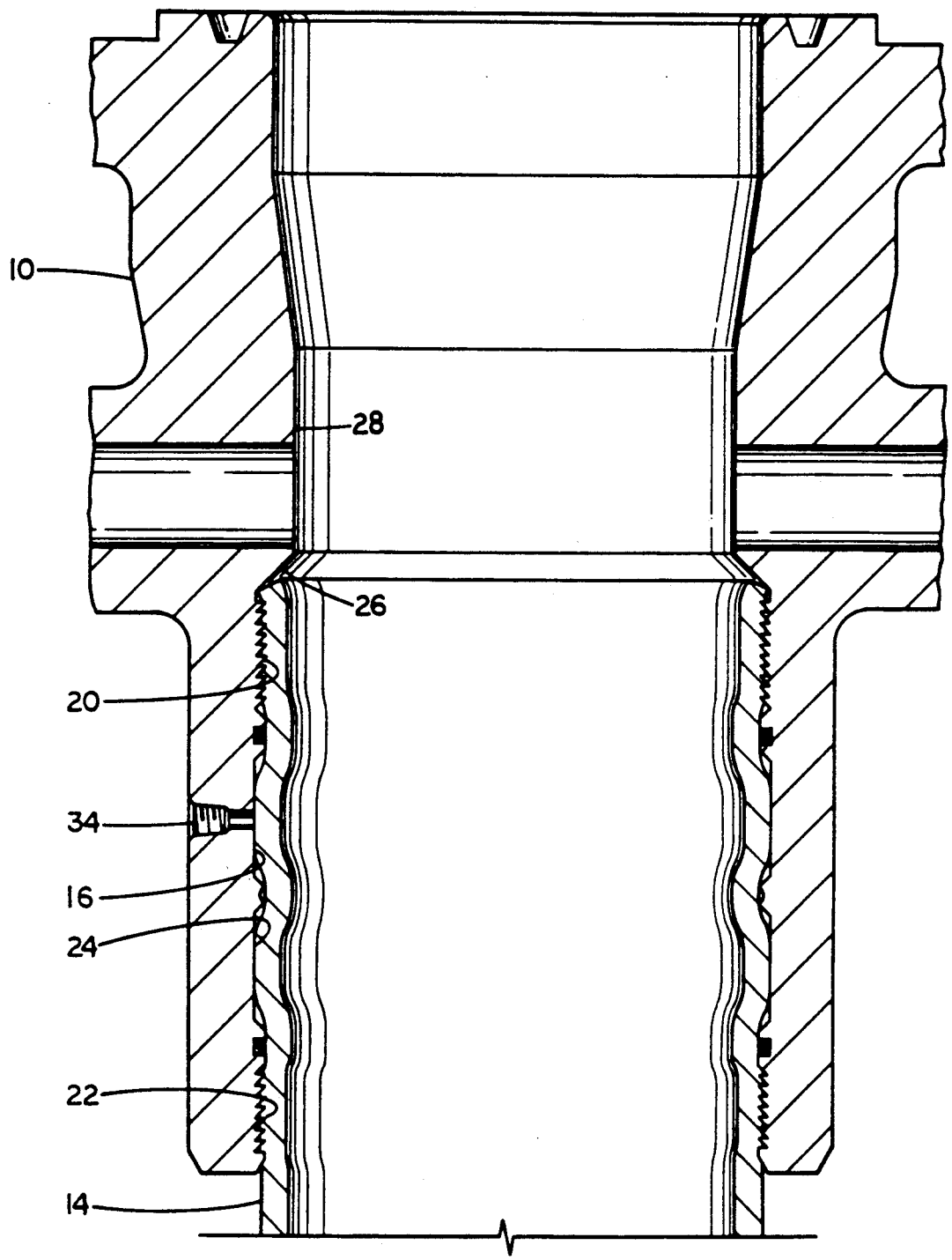
FIG. 3 is a partial sectional view of the position of the tubular member within the recess in the well support member subsequent to the cold forming of the tubular into tight, preloaded gripping and sealing the well support member.

As best seen in FIGS. 2 and 3, inner surface 16 of housing 10 includes upper lightly serrated surface 20, lower lightly serrated surface 22, intermediate land and grooved surface 24 and upper tapered surface 26 which tapers from the upper end of surface 20 upwardly and inwardly to the inner cylindrical surface 28 of housing 10. Seal rings 30 and 32 are positioned within grooves into inner surface 16 between upper surface 20 and intermediate surface 24 and between intermediate surface 24 and lower surface 22. Test port 34 extends through the body of housing 10 into communication with the interior of intermediate land and grooved surface 22.

To accomplish the desired compression preloading of the joint during the cold forging it is important that the relative positions of housing 10 and the upper end of tubular member 14 be precisely controlled to maintain the upper end of tubular member 14 in engagement with tapered surface 26 prior to forming. Also, the positioning of forming tool 18 should be carefully adjusted to ensure that the forming of tubular member 14 causes its upper end to be maintained in contact with tapered surfaced 26 and to move both outward and downward along surface 26 during forming to provide the compression preload for the joint.

Forming tool 18 is shown in FIG. 2 having its resilient sleeve 36 positioned within tubular member 14 and with its upper and lower rings 38 and 40 of sleeve supporting segments positioned within tubular member 14 approximately within surfaces 20 and 22 and also close to tapered surface 26 to ensure that tubular member 14 is formed outwardly against surfaces 20, 22, 24 and 26.

Figure 4:
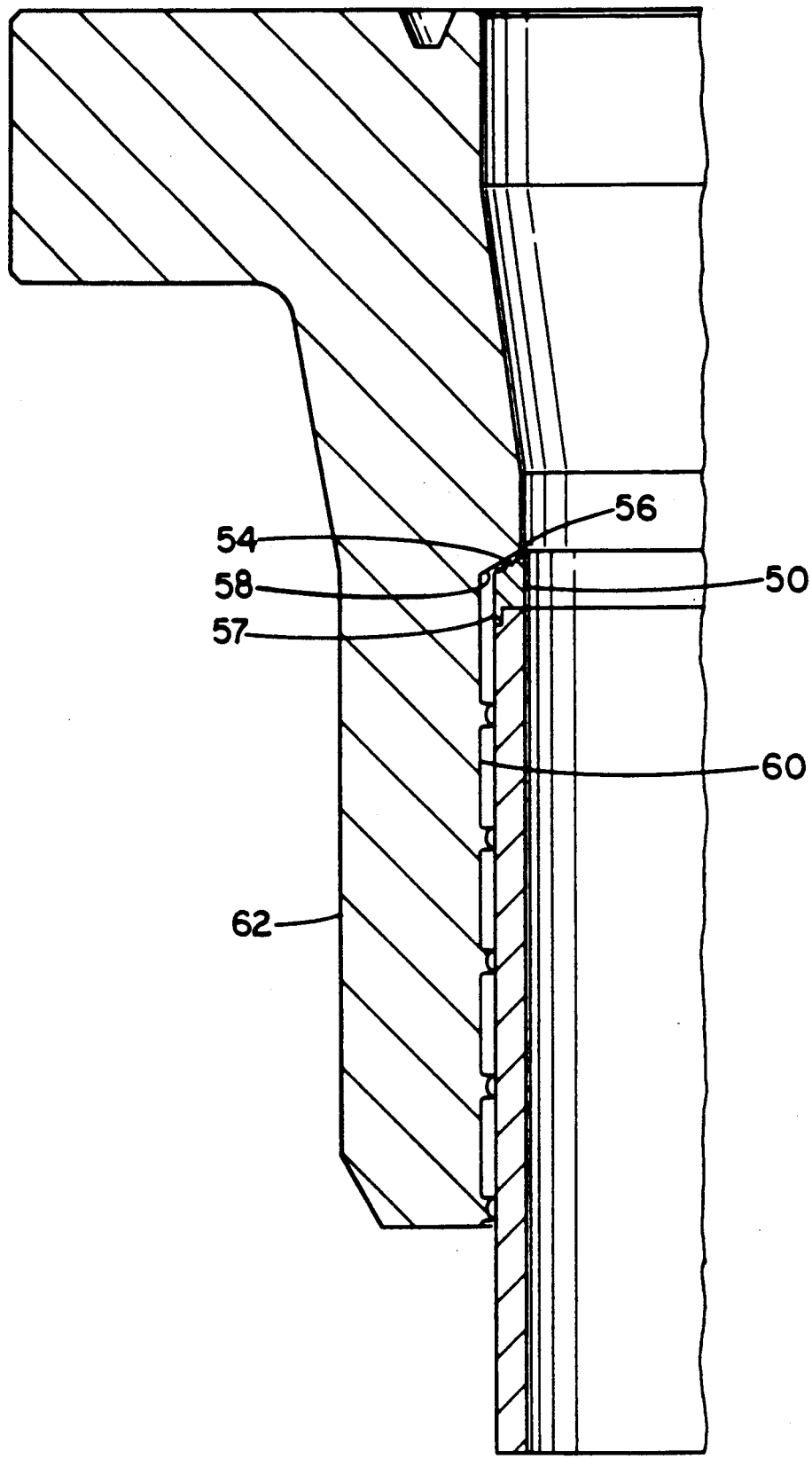
FIG. 4 is a partial sectional view of a modified form of the present invention providing the improved joint prior to cold forming.
Figure 5:
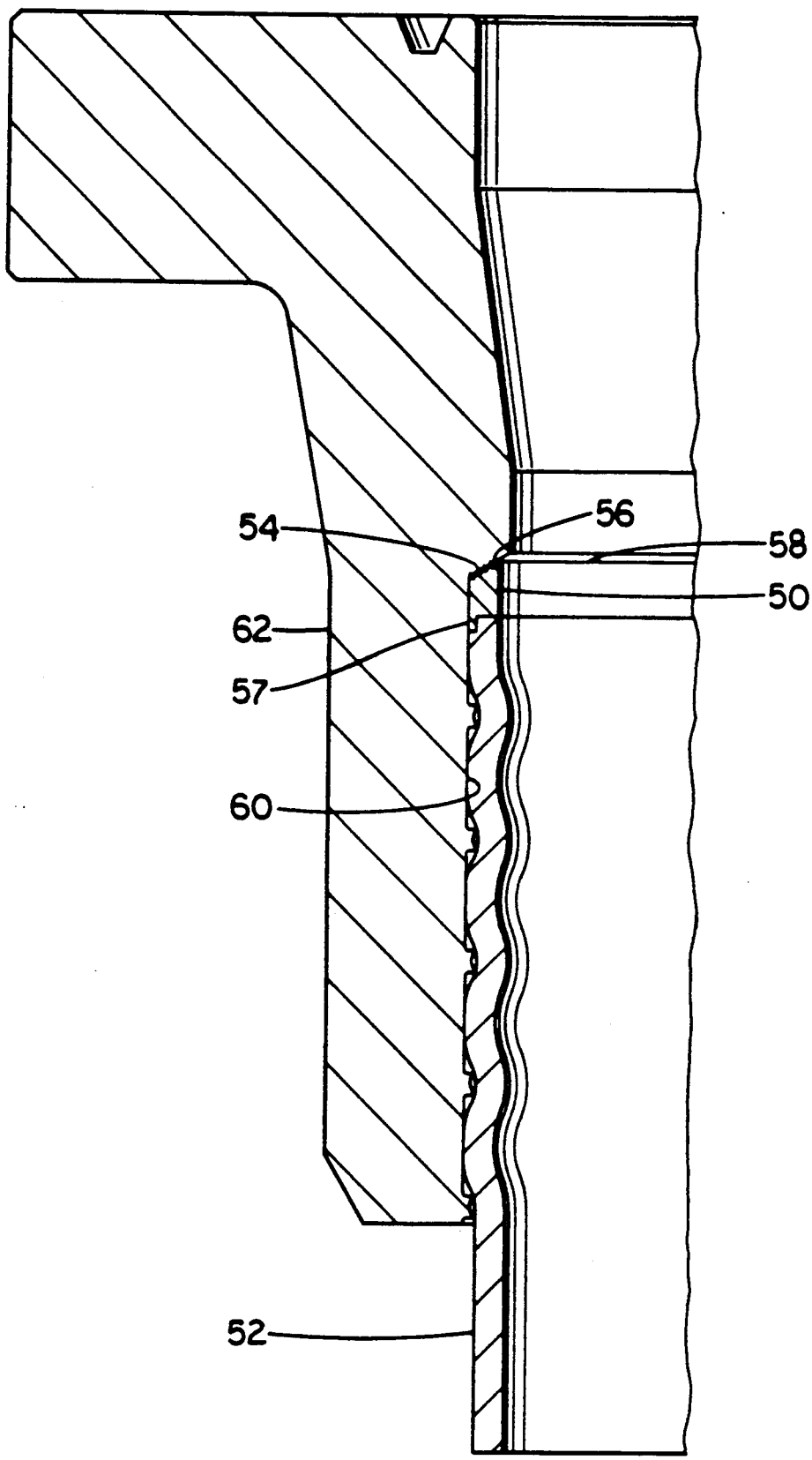
FIG. 5 is another partial sectional view of the structure shown in FIG. 4 after forming.

In the modified form of the invention shown in FIGS. 4 and 5, wedge ring 50 is provided to be positioned on the upper end of tubular member 52. Wedge ring 50 has substantially the same thickness as tubular member 52 and has upper surface 54 tapered downwardly and outward and having buttress type threads 56 and includes an outer depending skirt 57 which tightly engages the exterior surface of tubular member 52 to retain wedge ring 50 in its desired position, as shown in FIG. 4 and 5. The taper of surface 54 is preferred to be the same taper as the taper of upper tapered surface 58 on the upper end of inner surface 60 of housing 62. Upon completion of the forming of tubular member 52 and wedge ring 50 as shown in FIG. 5, the teeth of threads 56 are facing in a direction to dig into surface 58 to prevent relaxation of the compression preload and by facing inward they do not limit the outward movement of wedge ring 50 during forming so that the compression preload is properly provided.

Figure 6:
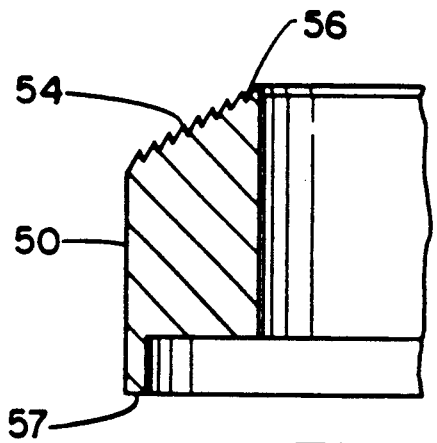
FIG. 6 is a partial view of the improved wedge ring used with the tubular member in the modified form of the invention.
Figure 7:
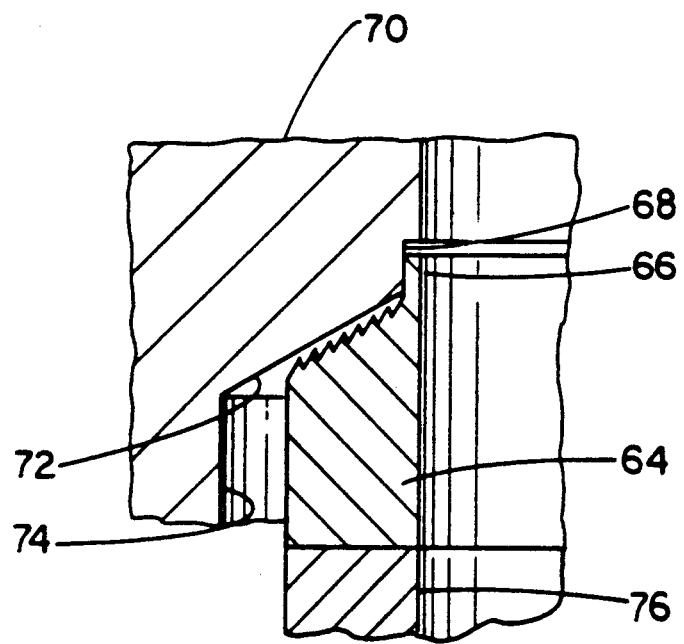
FIG. 7 is another partial view of a modified form of the wedge ring shown in FIG. 6.

Another form of wedge ring 64, illustrated in FIG. 7, may be used in place of wedge ring 50 illustrated in FIGS. 4, 5, and 6. With wedge ring 64, it is substantially the same as wedge ring 50 except that it does not include a depending skirt but has upwardly extending annular lip 66 forming an extension of the inner surface of ring 64 and is tightly engaged within recess 68 formed in housing 70 immediately above upper tapered surface 72 in inner recess 74 of housing 70. With annular lip 66 tightly engaged within recess 74 wedge ring 64 is retained in its position on the upper end of tubular member 76 and during the forging operation is wedged outwardly and downwardly with the upper end of tubular member 76 to provide the compression preload for the joint. Annular lip 66 is bent inwardly by the outward forming of wedge ring 64 to form a metal-to-metal lip seal.

What is claimed is:

1. A preloaded joint comprising:
an annular wellhead member,
a well string having an upper end,
said wellhead member having an internal recess with an upper end and a lower end, the upper end of said recess being tapered radially inward and upward, said wellhead member recess having a plurality of grooves below said upper end,
said well string being radially cold formed into said recess with its upper end being wedged downwardly by said tapered upper end of said recess to provide a compression preload on said well string in addition to a tight gripping and sealing engagement between said well string and the interior of said wellhead member as said well string is radially cold formed into said recess,
said well string is radially formed into said grooves to provide said gripping and sealing engagement.

2. A joint according to claim 1 including:
a wedge ring positioned between the upper end of said well string and the tapered upper end of said internal recess.

3. A joint according to claim 2 including:
means providing tight engagement of said wedge ring between the upper end of said well string and said tapered upper end of said recess prior to forming.

4. A joint comprising:
an annular wellhead member,
a well string having an upper end,
said wellhead member having an internal recess with an upper end and a lower end, the upper end of said recess being tapered radially inward and upward,
said well string being cold formed into said recess with its upper end being wedged downwardly by said tapered upper end of said recess to provide a compression preload on said well string as it is in addition to a tight gripping and sealing engagement between said well string and the interior of said wellhead member.
a wedge ring positioned between the upper end of said well string and the tapered upper end of said internal recess, and
means providing tight engagement of said wedge ring between the upper end of said well string and said upper tapered surface of said recess prior to forming,
said tight engagement means of said wedge ring including
a skirt depending from the lower outer periphery of said wedge ring and tightly engaging the exterior surface surrounding the upper end of said well string.

5. A joint comprising:
an annular wellhead member,
a well string having an upper end,
said wellhead member having an internal recess with an upper end and a lower end, the upper end of said recess being tapered radially inward and upward,
said well string being cold formed into said recess with its upper end being wedged downwardly by said tapered upper end of said recess to provide a compression preload on said well string as it is in addition to its tight gripping and sealing engagement between said well string and the interior of said wellhead member,
a wedge ring positioned between the upper end of said well string and the tapered upper end of said internal recess, and
means providing tight engagement of said wedge ring between the upper end of said well string and said upper tapered surface of said recess prior to forming,
said tight engagement means of said wedge ring including
said wedge ring having an upper tapered, threaded surface adapted to engage said upper tapered end of said recess,
a shallow recess on the interior of said wellhead member at the inner end of said tapered upper end of said internal recess, and
a lip extending from the inner portion of said wedge ring into tight engagement with said shallow recess to retain said wedge ring in position with its tapered, threaded surface in engagement with said upper tapered and of said recess.

* * * * *